US008526371B2

(12) United States Patent
Malladi et al.

(10) Patent No.: US 8,526,371 B2

(45) Date of Patent: Sep. 3, 2013

(54) FREQUENCY DIVERSE TRANSMISSIONS IN A WIRELESS COMMUNICATION SYSTEM

(75) Inventors: Durga Prasad Malladi, San Diego, CA (US); Brian Clarke Banister, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 943 days.

(21) Appl. No.: 12/190,432

(22) Filed: Aug. 12, 2008

(65) Prior Publication Data

US 2009/0073929 A1 Mar. 19, 2009

Related U.S. Application Data

(60) Provisional application No. 60/955,543, filed on Aug. 13, 2007.

(51) Int. Cl.
*H04W 72/00* (2009.01)

(52) U.S. Cl.
USPC ........... 370/329; 370/335; 370/330; 370/337; 375/260; 375/340

(58) Field of Classification Search
USPC .................................. 370/329, 335, 330, 401
See application file for complete search history.

(56) References Cited

U.S. PATENT DOCUMENTS

| | | | | |
|---|---|---|---|---|
| 6,151,296 | A | 11/2000 | Vijayan et al. | |
| 6,975,869 | B1 * | 12/2005 | Billon | 455/452.1 |
| 8,031,785 | B2 * | 10/2011 | Mo et al. | 375/260 |
| 2003/0037185 | A1 * | 2/2003 | Davis et al. | 710/1 |
| 2006/0280116 | A1 | 12/2006 | Ji et al. | |
| 2007/0242636 | A1 * | 10/2007 | Kashima et al. | 370/329 |
| 2008/0192847 | A1 * | 8/2008 | Classon et al. | 375/260 |
| 2008/0240034 | A1 * | 10/2008 | Gollamudi | 370/330 |

FOREIGN PATENT DOCUMENTS

| | | | |
|---|---|---|---|
| EP | 1662825 | A1 | 5/2006 |
| JP | 2005522130 | A | 7/2005 |
| RU | 2216873 | | 11/2003 |
| WO | WO9939473 | A1 | 8/1999 |

(Continued)

OTHER PUBLICATIONS

Intel Corporation: "Donwlin OFDMA resource allocation and mapping rules for distributed mode users in E-UTRA" 3GPP TSG RAN WG1 #44-bis, Athens, Greece, Mar. 27-31, 2006.*

(Continued)

*Primary Examiner* — Rasheed Gidado

(74) *Attorney, Agent, or Firm* — Paul Kuo

(57) ABSTRACT

Techniques for dynamically mapping assigned resources to physical resources are described herein. In one design, a resource assigned for communication may be mapped to a first physical resource based on a first mapping function and to a second physical resource based on a second mapping function. The assigned resource may be configurable for hopping or no hopping. The first mapping function may be a transparent function or may map consecutive input indices to non-consecutive output indices. The second mapping function may be equal to an output of the first mapping function plus an offset defined by a step size and a hop value. The hop value may be configurable for the assigned resource and may be conveyed in a resource assignment. The hop value may be set to a first value to indicate no hopping or to a second value to indicate hopping by the step size.

32 Claims, 7 Drawing Sheets

500

Start

512 Determine a resource (e.g., a VRB) assigned for communication

514 Map the assigned resource to a first physical resource (e.g., a first PRB in a first slot) based on a first mapping function 516 Map the assigned resource to a second physical resource (e.g., a second PRB in a second slot) based on a second mapping function comprising the first mapping function 518 Use the first and second physical resources for communication End

(56) References Cited

FOREIGN PATENT DOCUMENTS

| | | | |
|---|---|---|---|
| WO | WO2005043948 | A2 | 5/2005 |
| WO | WO2007024936 | | 3/2007 |
| WO | WO2007082754 | A1 | 7/2007 |

OTHER PUBLICATIONS

NTT DoCoMo et al. "Distributed FDMA TRansmission for Shared Data Channel in E-UTRA Downlink", 3GPP TSG-RAN WG1 Meeting #44bis, Atthens, Greece, Mar. 27-31, 2006.*

Ericsson: "E-UTRA DL—Localized and distributed transmission" Internet Citation, [Online] XP002441567 Retrieved from the Internet: URL:http://www.3gpp.org/ftp/tsg_ran/WG1_RL I/TSGRI_AH/LTE_AH_January-06/Docs/> [retrieved on Jul. 9, 2007] the whole document.

International Search Report and the Written Opinion—PCT/US2008/073063, International Search Authority—European Patent Office—May 11, 2009.

Motorola et al: "EUTRA Downlink Distributed Multiplexing and Mapping Rules TP" Internet Citation, [Online] May 8, 2006, XP007903801 Retrieved from the Internet: URL:http://www.3gpp.org/ftp/tsg_ran/WG1_RL I/TSGRI_45/Docs/RI-061173.zip> [retrieved on Jan. 10, 2008] the whole document.

Qualcomm Europe: "Principles of Unicast Scheduling for Downlink and Uplink" 3GPP Draft; RI-070439, 3rd Generation Partnership Project (3GPP), Mobile Competence Centre ; 650, Route Des Lucioles ; F-06921 Sophia-Antipolis Cedex ; France, vol. tsg ranWGI_RLITSGRI_47bisDocs, no. Sorrento, I t a l y ; 20070115, Jan. 9, 2007, XP050104470 the whole document.

Qualcomm Europe: "Pseudo-random hopping pattern for PDSCH" 3GPP Draft; RI-073265, 3rd Generation Partnership Project (3GPP), Mobile Competence Centre ; 650, Route Des Lucioles ; F-06921 Sophia-Antipolis Cedex ; France, vol. tsg_ranWGI_RLITSGRI_50Docs, no. Athens, Greece; 20070820, Aug. 14, 2007, XP050106900 the whole document.

Qualcomm Europe: "PUSCH and PUCCH hopping patterns" 3GPP Draft; RI-073264, 3rd Generation Partnership Project (3GPP), Mobile Competence Centre ; 650, Route Des Lucioles ; F-06921 Sophia-Antipolis Cedex ; France, vol. tsg_ranWGI_RLITSGRI_50Docs, no. Athens, Greece; 20070820, Aug. 14, 2007, XP050106899 chapter 2.5 Multiplexing of hopped and non-hopped transmissions.

Taiwan Search Report—TW097130808—TIPO—May 2, 2012.

* cited by examiner 100
110
110
110
120

FREQUENCY DIVERSE TRANSMISSIONS IN A WIRELESS COMMUNICATION SYSTEM

The present application claims priority to provisional U.S. Application Ser. No. 60/955,543, entitled "FREQUENCY DIVERSE TRANSMISSIONS IN THE DL OF E-UTRA," filed Aug. 13, 2007, assigned to the assignee hereof and incorporated herein by reference.

BACKGROUND

I. Field

The present disclosure relates generally to communication, and more specifically to transmission techniques for a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may serve many user equipments (UEs) located throughout the coverage area of the Node B. These UEs may observe different channel conditions (e.g., different fading, multipath, and interference effects) and may achieve different signal-to-noise-and-interference ratios (SINRs). Furthermore, a given UE may observe frequency selective fading and may achieve different SINRs across the system bandwidth. It may be desirable to transmit data to the UEs such that good performance can be achieved for these UEs.

SUMMARY

Techniques for dynamically mapping assigned resources to physical resources in order to support frequency diversity scheduling (FDS) and frequency selective scheduling (FSS) in a wireless communication system are described herein. FDS may also be referred to as distributed scheduling and may be used to improve frequency diversity and obtain noise and interference averaging. FSS may also be referred to as localized scheduling and may be used for transmission on the best subband for a UE.

In one design, a resource assigned to a UE may be mapped to a first physical resource based on a first mapping function. The assigned resource may also be mapped to a second physical resource based on a second mapping function that includes the first mapping function. The assigned resource may be configurable for either FDS/hopping or FSS/no hopping based on at least one parameter for the second mapping function. The first and second physical resources may be used for communication.

In one design, the assigned resource may comprise a virtual resource block (VRB), the first physical resource may comprise a first physical resource block (PRB) in a first slot of a subframe, and the second physical resource may comprise a second PRB in a second slot of the subframe. Each resource block may comprise multiple subcarriers in one slot. The assigned resource and the physical resources may also comprise other types of resources.

In one design, the first mapping function may be a transparent function that receives an input index and provides an output index equal to the input index. In another design, the first mapping function may map consecutive input indices to non-consecutive output indices to achieve interleaving of resources.

In one design, the second mapping function may be equal to an output of the first mapping function plus an offset defined by a step size and a hop value. The step size may be semi-static and conveyed in a broadcast channel. The hop value may be configurable for the assigned resource and may be conveyed in a resource assignment. In one design, the hop value may be set to a first value to indicate no hopping or to a second value to indicate hopping by the step size. The hop value may also be set to a third value to indicate hopping by minus the step size.

In one design, which is referred to as a first dynamic resource mapping scheme, the available VRBs may be dynamically allocated for FDS and FSS. An assigned VRB may be mapped to a first PRB based on the first mapping function and to a second PRB based on the second mapping function.

In another design, which is referred to as a second dynamic resource mapping scheme, the available VRBs may be semi-statically allocated for FDS and FSS. The VRBs allocated for FDS may be assigned virtual indices, and hopping may be performed on the virtual indices. In one mapping design, an assigned VRB may be mapped to a virtual index based on a forward mapping. The virtual index may then be mapped to a first intermediate index based on the first mapping function and to a second intermediate index based on the second mapping function. The first intermediate index may be mapped to a first PRB based on an inverse mapping that is complementary to the forward mapping. The second intermediate index may be mapped to a second PRB based on the inverse mapping. In another mapping design, the assigned VRB may be mapped directly to the first and second PRBs based on first and second overall mapping functions, respectively.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
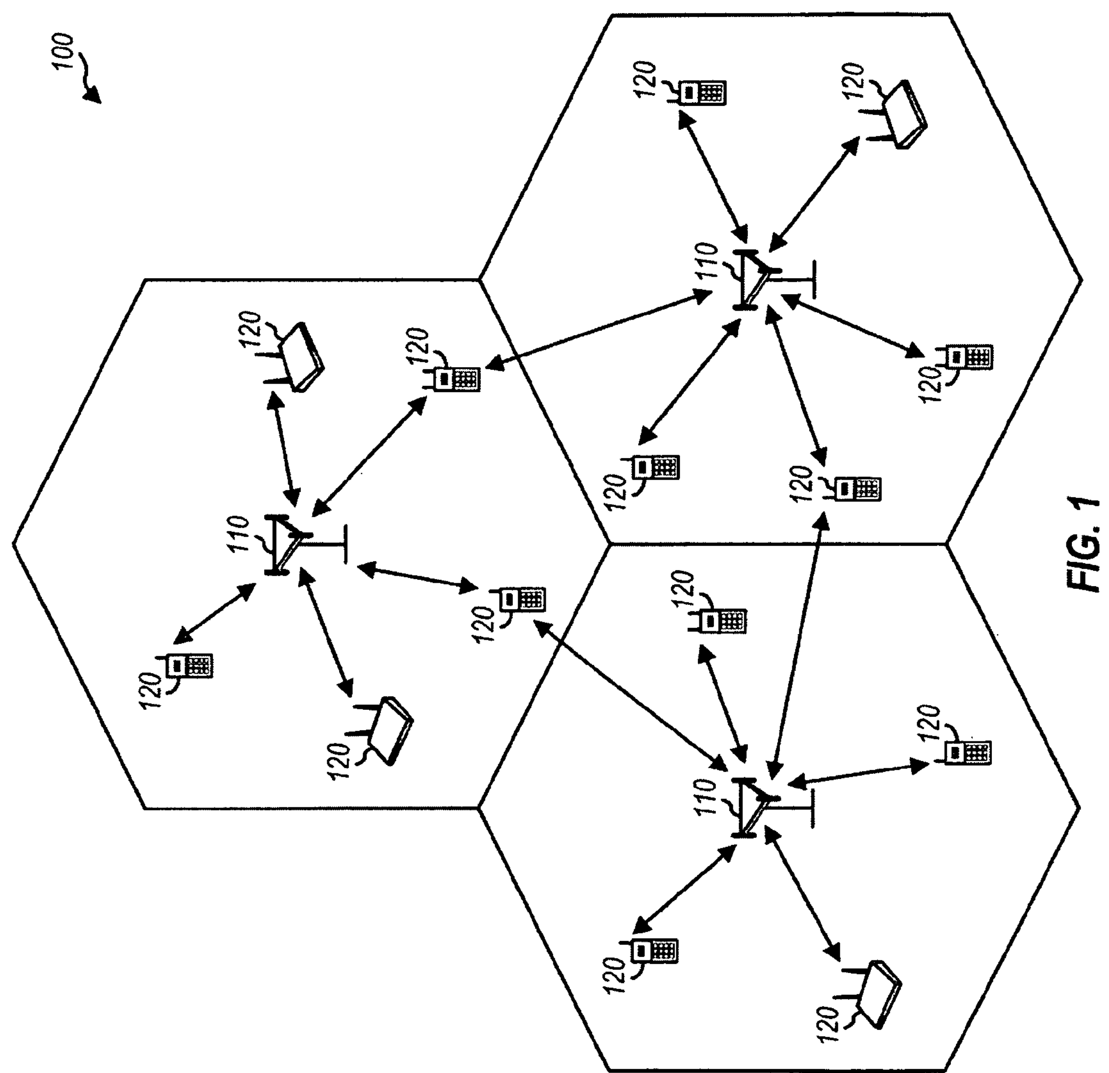
FIG. 1 shows a wireless communication system.

FIG. 1 shows a wireless communication system 100, which may be an LTE system. System 100 may include a number of Node Bs 110 and other network entities. A Node B may be a fixed station that communicates with the UEs and may also be referred to as an evolved Node B (eNB), a base station, an access point, etc. Each Node B 110 provides communication coverage for a particular geographic area and supports communication for the UEs located within the coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 2:
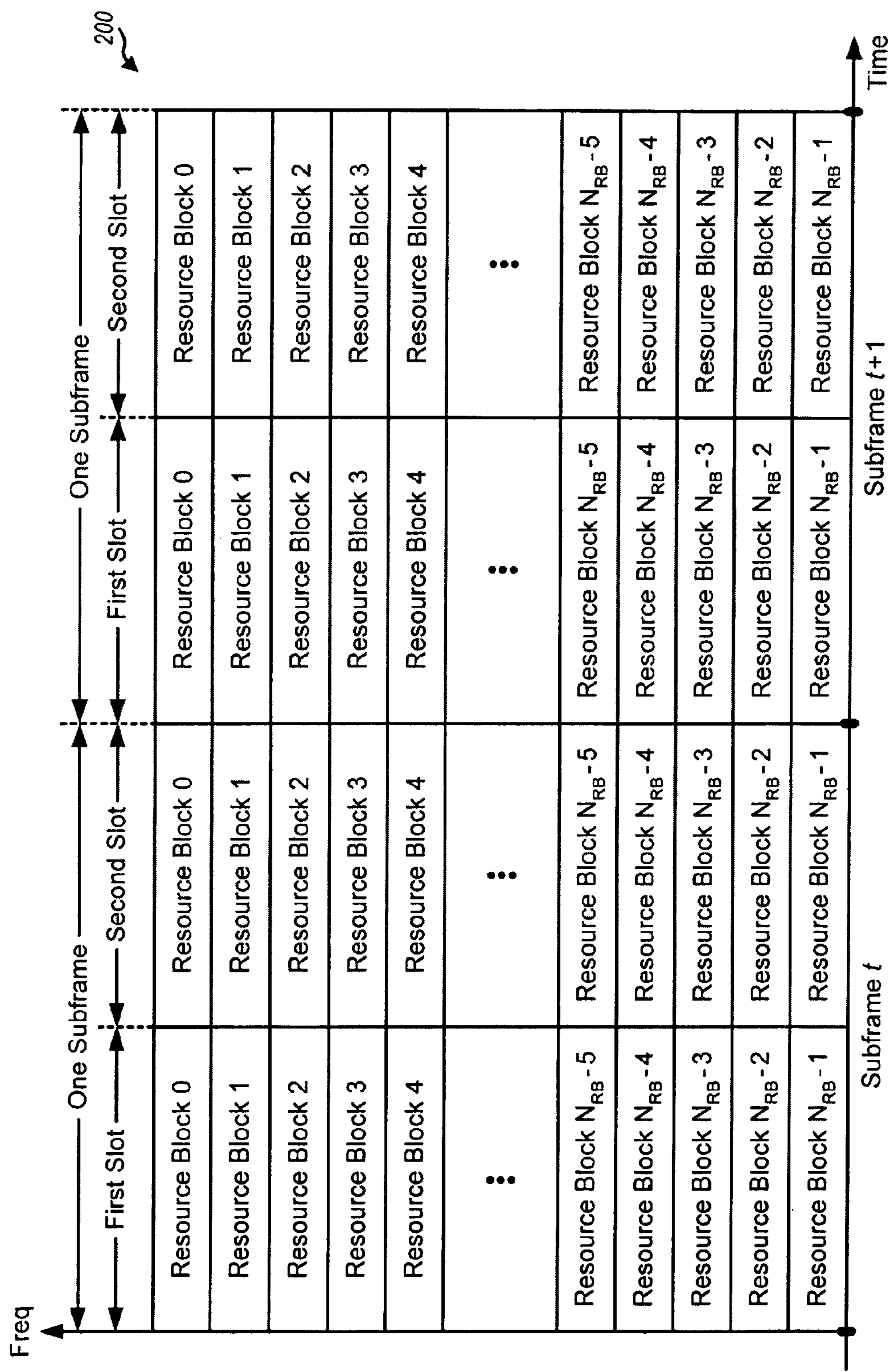
FIG. 2 shows an example resource structure.

FIG. 2 shows a design of a resource structure 200 that may be used for the downlink or uplink. The transmission timeline may be partitioned into units of subframes, and each subframe may have a predetermined duration, e.g., one millisecond (ms). A subframe may be partitioned into two slots, which may include a first/left slot and a second/right slot. Each slot may include a fixed or configurable number of symbol periods, e.g., six symbol periods for an extended cyclic prefix or seven symbol periods for a normal cyclic prefix.

The K total subcarriers may be grouped into $N_{RB}$ resource blocks (RBs). Each resource block may include $N_{SC}$ subcarriers (e.g., $N_{SC}=12$ subcarriers) in one slot. The number of resource blocks in each slot may be dependent on the system bandwidth and may be given as $N_{RB}=K/N_{SC}$. The K total subcarriers may also be partitioned into $N_{SB}$ subbands. Each subband may include $6 \cdot N_{SC}$ subcarriers in six resource blocks and may span 1.08 MHz.

The system may support frequency diversity scheduling (FDS) and frequency selective scheduling (FSS) on the downlink and/or uplink. Table 1 provides a short description of each scheduling type. For clarity, much of the description below is for FDS and FSS on the downlink.

TABLE 1

| Scheduling Type | Description |
|---|---|
| Frequency selective scheduling (FSS) | Transmission for a UE is sent on subcarriers within a portion of the system bandwidth, e.g., within a selected subband. |
| Frequency diversity scheduling (FDS) | Transmission for a UE is sent on subcarriers spanning all or a large portion of the system bandwidth, e.g., in multiple subbands. |

FDS and FSS may be supported in various manners. In one design, the $N_{SB}$ subbands may be partitioned into an FDS part and an FSS part, and each subband may be used for either FDS or FSS. Information indicating which subbands are used for FDS and which subbands are used for FSS may be sent on a dynamic broadcast channel (D-BCH) or conveyed in some other manner. For example, a subband bit mask may include one bit for each of the $N_{SB}$ subbands. The bit for each subband may be set to '0' to indicate that the subband is used for FDS or to '1' to indicate that the subband is used for FSS.

FDS may be achieved with frequency hopping (or simply, "hopping"). For frequency hopping, a transmission for a UE may be sent in different parts of the system bandwidth in different hop periods. A hop period is an amount of time spent on a given set of subcarriers and may be equal to one symbol period, one slot, one subframe, etc. Different sets of subcarriers may be selected for the UE from among all subcarriers allocated for FDS.

FDS may be supported with symbol-and-subcarrier level hopping or slot-and-resource block level hopping. For symbol-and-subcarrier level hopping, a transmission for a UE may be sent on different subcarriers in different symbol periods. Symbol-and-subcarrier level hopping may maximize frequency diversity as well as noise and interference averaging. For slot-and-resource block level hopping, a transmission for a UE may be sent on different resource blocks in different slots. In general, a resource block may include consecutive or non-consecutive subcarriers. Transmission on consecutive/contiguous subcarriers may be desirable for the uplink to achieve localized frequency division multiplexing (LFDM), which is a variant of SC-FDM that may reduce peak to average power ratio (PAPR).

Virtual resource blocks (VRBs) may be defined to simplify allocation of resources for both symbol-and-subcarrier level hopping and slot-and-resource block level hopping. A VRB may include $N_{SC}$ subcarriers in the virtual domain in one slot. A physical resource block (PRB) may include $N_{SC}$ consecutive physical subcarriers in one slot. A VRB may be mapped to $N_D$ PRBs based on a predetermined mapping, where $N_D \geqq 1$. The predetermined mapping may be dependent on whether symbol-and-subcarrier level hopping or slot-and-resource block level hopping is employed. A VRB may be mapped to different subcarriers in different symbol periods for symbol-and-subcarrier level hopping. A VRB may be mapped to either a set of consecutive subcarriers in a slot (in one PRB) or a set of non-consecutive subcarriers in a slot (in multiple PRBs) for slot-and-resource block level hopping. In any case, VRBs may be allocated to the UEs, and transmissions for the UEs may be sent on subcarriers to which the VRBs are mapped.

In an aspect, FDS may be supported by dynamically mapping VRBs to subcarriers and sending signaling to convey the dynamic mapping. The dynamic mapping may be used for symbol-and-subcarrier level hopping as well as slot-and-resource block level hopping. For clarity, the dynamic mapping is described below for slot-and-resource block level hopping with one VRB being mapped to one PRB in one slot.

In a first dynamic resource mapping scheme, the available VRBs may be selectively used for FDS or FSS, and there is no need to semi-statically allocate VRBs for FDS and FSS. The K total subcarriers may be grouped into $N_{RB}$ PRBs with indices of 0 through $N_{RB}-1$. $N_{RB}$ VRBs with indices of 0 through $N_{RB}-1$ may be defined. The number of PRBs in the system may be dependent on the system bandwidth and may be signaled in a primary broadcast channel (P-BCH).

A UE may be assigned a resource block pair composed of a VRB with an index of $index_{VRB}$ in the first slot of a subframe and a VRB with the same index of $index_{VRB}$ in the second slot of the subframe. The VRB in the first slot may be mapped to one PRB in the first slot, and the VRB in the second slot may be mapped to one PRB in the second slot. Equivalently, the UE may be assigned a VRB with an index of $index_{VRB}$ for an entire subframe. This VRB may be mapped to one PRB in the first slot and to another PRB in the second slot. For clarity, much of the following description assumes that the UE is assigned a VRB for a subframe.

In one design, a VRB may be mapped to a PRB in the first slot as follows:

$$index_{PRB1}=g(index_{VRB}), \qquad \text{Eq (1)}$$

where $index_{VRB}\in\{0, \ldots, N_{RB}-1\}$ is an index of the VRB, $index_{PRB1}\in\{0, \ldots, N_{RB}-1\}$ is an index of the PRB in the first slot to which the VRB is mapped, and $g(\cdot)$ is a first mapping function for the first slot.

The first mapping function $g(\cdot)$ has a one-to-one mapping from VRB index to PRB index. In one design, the first mapping function may be a transparent function, so that $index_{PRB1}=index_{VRB}$. In this design, the PRBs may be directly assigned to the UEs, and the VRBs may not need to be defined. In another design, the first mapping function may map consecutive VRBs to different PRBs to achieve interleaving. In this design, a UE may be assigned consecutive VRBs that may be mapped to non-consecutive PRBs, which may provide frequency diversity for the first slot.

In one design, a VRB may be mapped to a PRB in the second slot as follows:

$$\begin{aligned} index_{PRB2} &= h(index_{VRB}) \\ &= [g(index_{VRB}) + \gamma\cdot\Delta]\bmod N_{RB} \\ &= [index_{PRB1} + \gamma\cdot\Delta]\bmod N_{RB} \end{aligned} \qquad \text{Eq (2)}$$

where $\Delta$ is a step size, $\gamma$ is a hop value, which may be a zero or non-zero integer value, $index_{PRB2}\in\{0, \ldots, N_{RB}-1\}$ is an index of a PRB in the second slot to which the VRB is mapped, $h(\cdot)$ is a second mapping function for the second slot, and "mod" denotes a modulo operation.

In the design shown in equation (2), the second mapping function $h(\cdot)$ comprises the first mapping function $g(\cdot)$ and is equal to an output of the first mapping function plus an offset. This offset is defined by the step size $\Delta$ and the hop value $\gamma$.

The step size $\Delta$ may be (i) a static value that is specified in a standard, (ii) a semi-static value that may be conveyed in the D-BCH, or (iii) a dynamic value that may be conveyed in a resource assignment for a UE. The step size may be equal to $N_{RB}/4$, or $N_{RB}/2$, or some other value.

The hop value $\gamma$ may be dynamic and conveyed in a resource assignment. A hop value of 0 may indicate no frequency hopping for the transmission in the second slot of a subframe. A non-zero hop value may indicate frequency hopping for the transmission in the second slot. The hop value may be an integer value, and the offset $\gamma\cdot\Delta$ may be an integer number of the step size. Frequency hopping may be defined by a circular offset of $\gamma\cdot\Delta$, so that a PRB index that is greater than $N_{RB}$ would wrap around and map to a valid PRB index that is within a range of 0 to $N_{RB}-1$. This circular offset is achieved with the modulo $N_{RB}$ operation in equation (2). A UE may be assigned one or more VRBs in a resource assignment. The same hop value $\gamma$ may be used for all VRBs in the resource assignment.

In one design, one bit may be used for the hop value $\gamma$ and may be defined as follows:

$\gamma=0\rightarrow$frequency hopping is disabled; use the same PRB in the second slot, and $\gamma=+1\rightarrow$frequency hopping is enabled; the PRB in the second slot is $+\Delta$ from the PRB in the first slot.

In another design, two bits may be used for the hop value $\gamma$ and may be defined as follows:

$\gamma=0\rightarrow$frequency hopping is disabled; use the same PRB in the second slot, $\gamma=+1\rightarrow$frequency hopping is enabled; the PRB in the second slot is $+\Delta$ from the PRB in the first slot, and $\gamma=-1\rightarrow$frequency hopping is enabled; the PRB in the second slot is $-\Delta$ from the PRB in the first slot.

In general, the hop value $\gamma$ may be conveyed with one or more bits. The hop value may have only non-negative values (e.g., 0 and +1) or both negative and non-negative values (e.g., 0, +1 and −1). The hop value may be defined such that $N_{RB}$ and $\gamma$ are co-prime. The use of both negative and positive hop values (e.g., +1 and −1) may allow two VRBs to be mapped to two PRBs in a complementary manner. For example, VRB a may map to PRB x in the first slot and to PRB y in the second slot with $\gamma=+1$, and VRB b may map to PRB y in the first slot and to PRB x in the second slot with $\gamma=-1$, where PRB y may be offset by $+\Delta$ from PRB x. If $\Delta=N_{RB}/2$, then $\gamma=+1$ may be used to map VRB a to PRBs x and y in the two slots and to also map VRB b to PRBs y and x in the two slots. In this case, $\gamma=-1$ may be unnecessary, and the hop value may be conveyed with one bit.

Equations (1) and (2) show one design of dynamic mapping of VRBs to PRBs. In general, the PRB in the second slot may be a function of the first mapping function $g(\cdot)$ for the first slot and an offset. The offset may be conveyed in a resource assignment or via some other mechanism.

The first dynamic resource mapping scheme may be illustrated by a specific example. In this example, ten PRBs are available and assigned indices of $index_{PRB}=0$ to 9. Ten VRBs are defined and assigned indices of $index_{VRB}=0$ to 9. The first mapping function $g(\cdot)$ is a transparent function, so that $index_{PRB1}=index_{VRB}$ for the first slot. The step size is $\Delta=4$. The hop value $\gamma$ may be 0, +1, or −1 and may be conveyed with two bits in a resource assignment.

In this example, four UEs are scheduled for transmission and receive the following resource assignments:

UE 1 is assigned VRBs 0 and 2 with FDS and $\gamma=+1$,

UE 2 is assigned VRBs 1 and 3 with FSS and $\gamma=0$,

UE 3 is assigned VRBs 4 and 6 with FDS and $\gamma=-1$, and

UE 4 is assigned VRB 5 with FDS and $\gamma=+1$.

Figure 3:
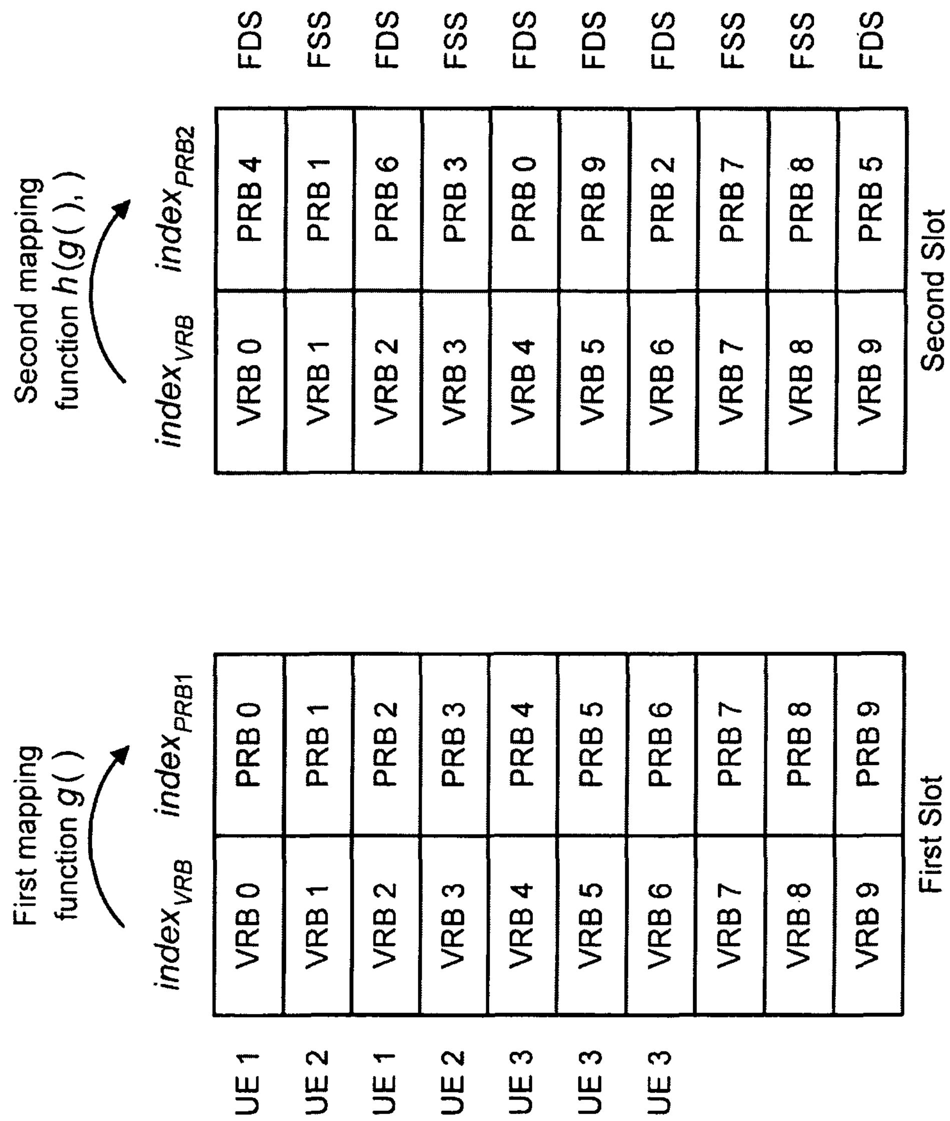
FIGS. 3 and 4 show mapping of VRBs to PRBs for the first and second dynamic resource mapping schemes, respectively.

FIG. 3 shows the mapping of VRBs to PRBs for the example described above. With a transparent first mapping function g(·), each VRB maps to a PRB with the same index in the first slot. Thus, VRB 0 maps to PRB 0, VRB 1 maps to PRB 1, and so on, and VRB 9 maps to PRB 9 in the first slot.

For the second slot, each VRB that is used for FDS maps to a different PRB, and each VRB that is used for FSS maps to the same PRB. UE 1 is assigned VRBs 0 and 2 with FDS and $\gamma=+1$, and VRBs 0 and 2 map to PRBs 4 and 6 in the second slot with $\Delta=4$. UE 2 is assigned VRBs 1 and 3 with FSS, and VRBs 1 and 3 map to PRBs 1 and 3 in the second slot. UE 3 is assigned VRBs 4 and 6 with FDS and $\gamma=-1$, and VRBs 4 and 6 map to PRBs 0 and 2 in the second slot. UE 4 is assigned VRB 5 with FDS and $\gamma=+1$, and VRB 5 maps to PRB 9 in the second slot.

For the first dynamic resource mapping scheme, a given VRB may be used for FDS by setting the hop value $\gamma$ to a non-zero value or for FSS by setting the hop value to a zero value. Signaling may be sent to convey whether the VRB is used for FDS or FSS. Any number of VRBs may be used for FDS in a given subframe, and any number of VRBs may be used for FSS. The allocation of VRBs for FDS and FSS may be dynamic for each subframe and may be based on data requirements of the UEs in that subframe. The VRBs used for FDS may be dispersed among the VRBs used for FSS, as illustrated by the example above. The first dynamic resource mapping scheme may flexibly support FDS and FSS with small signaling overhead.

In a second dynamic resource mapping scheme, the available VRBs may be semi-statically allocated for FDS and FSS. The VRBs allocated for FDS may be referred to as FDS VRBs and may be assigned virtual indices of 0 through $N_{FDS}-1$, where $N_{FDS}$ is the number of FDS VRBs. The FDS VRBs may be signaled in the P-BCH or conveyed in some other manner.

A forward mapping f(·) may map an actual index of an FDS VRB to a virtual index, as follows:

$$vindex=f(index_{VRB}), \qquad \text{Eq (3)}$$

where $index_{VRB} \in \{0, \ldots, N_{FDS}-1\}$ is an actual index of the FDS VRB, and $vindex \in \{0, \ldots, N_{FDS}-1\}$ is a virtual index of the FDS VRB.

An inverse mapping q(·) may map the virtual index of the FDS VRB back to the actual index, or $index_{VRB}=q(vindex)$. The inverse mapping may be complementary to the forward mapping.

In one design, an FDS VRB may be mapped to an intermediate index for the first slot, as follows:

$$index_{VRB1}=g(vindex), \qquad \text{Eq (4)}$$

where $index_{VRB1} \in \{0, \ldots, N_{FDS}-1\}$ is an intermediate index for the first slot to which the FDS VRB is mapped.

The first mapping function g(·) may be a transparent function so that $index_{VRB1}=vindex$. The first mapping function may also map consecutive virtual indices to non-consecutive intermediate indices to achieve interleaving.

The intermediate index for the first slot may be mapped to a PRB in the first slot based on the inverse mapping, as follows:

$$index_{PRB1}=q(index_{VRB1}). \qquad \text{Eq (5)}$$

In one design, an FDS VRB may be mapped to an intermediate index for the second slot, as follows:

$$\begin{aligned} index_{VRB2} &= h(vindex) \\ &= [g(vindex)+\gamma\cdot\Delta] \bmod N_{FDS} \\ &= [index_{VRB1}+\gamma\cdot\Delta] \bmod N_{FDS} \end{aligned} \qquad \text{Eq (6)}$$

where $index_{VRB2} \in \{0, \ldots, N_{FDS}-1\}$ is an intermediate index for the second slot to which the FDS VRB is mapped, and $\gamma$ is a hop value that may be equal to 0 or +1.

In the design shown in equation (6), the second mapping function h(·) comprises the first mapping function g(·) and is equal to an output of the first mapping function plus an offset.

The intermediate index for the second slot may be mapped to a PRB in the second slot based on the inverse mapping, as follows:

$$index_{PRB2}=q(index_{VRB2}). \qquad \text{Eq (7)}$$

For the second dynamic resource mapping scheme, the FDS VRBs may be assigned virtual indices of 0 to $N_{FDS}-1$. Each FDS VRB may then be mapped to an intermediate index for the first slot based on the first mapping function g(·) and also to an intermediate index for the second slot based on the second mapping function h(·). The indices vindex, $index_{VRB1}$ and $index_{VRB2}$ are all within a range of 0 to $N_{FDS}-1$. Hopping is effectively performed within an FDS region from 0 to $N_{FDS}-1$. By hopping within the FDS region, negative hop values may be eliminated. A resource assignment may then convey a hop value of 0 or +1 using only one bit, where 0 may indicate an FSS assignment and +1 may indicate an FDS assignment.

For the second dynamic resource mapping scheme, hopping for the first and second slots is achieved with the mapping functions g(·) and h(·) operating on indices in a virtual domain. Prior to hopping, the forward mapping f(·) maps the actual indices of the FDS VRBs to virtual indices. After hopping, the inverse mapping q(·) maps the intermediate indices in the virtual domain back to the actual indices of the PRBs.

In the design described above, a VRB may be mapped to a virtual index based on the forward mapping, the virtual index may be mapped to intermediate indices based on the first and second mapping functions, and the intermediate indices may be mapped to PRBs based on the inverse function. A VRB may also be mapped directly to PRBs in the first and second slots based on first and second overall mapping functions, respectively. Each overall mapping function may include the forward mapping, the first or second mapping function, and the inverse function. The forward and inverse mapping may thus be explicitly performed, as described above, or implicitly performed by the overall mapping functions.

Figure 4:
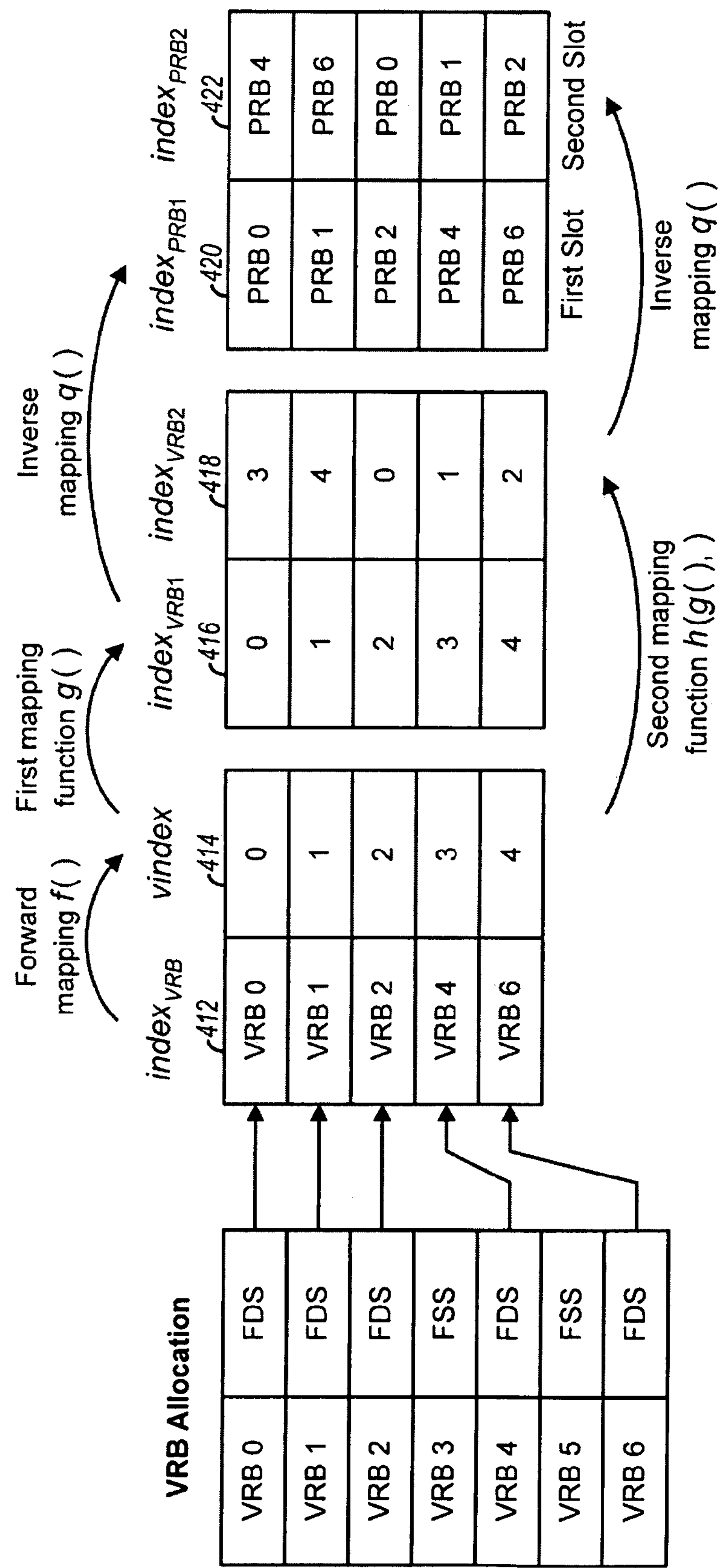

FIG. 4 illustrates the second dynamic resource mapping scheme with a specific example. In this example, seven PRBs are available and assigned indices of $index_{PRB}=0$ to 6. Seven VRBs are defined and assigned indices of $index_{VRB}=0$ to 6. The first mapping function g(·) is a transparent function, so that $index_{VRB1}=vindex$ for the first slot. The step size is $\Delta=3$. The hop value $\gamma$ may be 0 or +1 and may be conveyed with one bit in a resource assignment.

In the example shown in FIG. 4, five VRBs 0, 1, 2, 4 and 6 are allocated for FDS, and the remaining two VRBs 3 and 5 are allocated for FSS. The five FDS VRBs are shown in column 412. The five FDS VRBs are assigned sequentially increasing virtual indices of vindex=0 through 4, as shown in column 414.

The virtual index of each FDS VRB is mapped to an intermediate index for the first slot based on the first mapping function g(·), as shown in equation (4). In the example shown in FIG. 4, the first mapping function g(·) is transparent, and virtual indices of vindex=0 through 4 are mapped to intermediate indices of $index_{VRB1}$=0 through 4, respectively, as shown in column 416.

The virtual index of each FDS VRB is mapped to an intermediate index for the second slot based on the second mapping function h(·), as shown in equation (6). In the example shown in FIG. 4, Δ=3, and virtual indices of vindex=0, 1, 2, 3 and 4 are mapped to intermediate indices of $index_{VRB2}$=3, 4, 0, 1 and 2, respectively, as shown in column 418.

The intermediate indices for the first slot are mapped to PRB indices for the first slot based on the inverse mapping q(·). In the example shown in FIG. 4, intermediate indices of $index_{VRB1}$=0, 1, 2, 3 and 4 are mapped to PRB indices of $index_{PRB1}$=0, 1, 2, 4 and 6, respectively, as shown in column 420. Similarly, the intermediate indices for the second slot are mapped to PRB indices for the second slot based on the inverse mapping q(·). In the example shown in FIG. 4, intermediate indices of $index_{VRB2}$=3, 4, 0, 1 and 2 are mapped to PRB indices of $index_{PRB2}$=4, 6, 0, 1 and 2, respectively, as shown in column 422.

In the example shown in FIG. 4, VRB 0 is mapped to PRB 0 in the first slot and to PRB 4 in the second slot. VRB 1 is mapped to PRB 1 in the first slot and to PRB 6 in the second slot. The mapping for VRBs 2, 4 and 6 to PRBs are shown in columns 420 and 422.

The second dynamic resource mapping scheme may eliminate the need for negative hop values. A resource assignment may convey a hop value of either 0 or +1 using only one bit, which may reduce the amount of signaling. The second dynamic resource mapping scheme may also simplify scheduling since the FDS VRBs may be assigned to the UEs without having to keep track of ±Δ assignments. Hopping may also be achieved with simple increment by +Δ modulo the FDS total size $N_{FDS}$.

The first and second dynamic resource mapping schemes described above can support only FDS or both FDS and FSS. These mapping schemes allow for dynamic mapping of VRBs to PRBs with or without hopping for individual resource assignments with low signaling overhead. A resource assignment may include one or two bits to convey a hop value γ that may indicate whether or not to hop, which direction to hop, how much to hop, etc.

The first and second dynamic resource mapping schemes may be used for slot-and-resource block level hopping, as described above. In this case, VRBs may be defined and mapped to PRBs, as described above. These mapping schemes may also be used for symbol-and-subcarrier level hopping. In this case, virtual subcarrier sets may be defined and mapped to different physical subcarrier sets across a subframe based on a predetermined mapping. A resource assignment may include one or two bits to convey a hop value γ that may indicate whether or not to hop, which direction to hop, how much to hop, etc. For example, a virtual subcarrier set may be mapped to a first physical subcarrier set in even-numbered symbol periods and to a second physical subcarrier set in odd-numbered symbol periods for a hop value of +1. This virtual subcarrier set may be mapped to the second physical subcarrier set in even-numbered symbol periods and to the first physical subcarrier set in odd-numbered symbol periods for a hop value of −1.

Figures 5, 6:
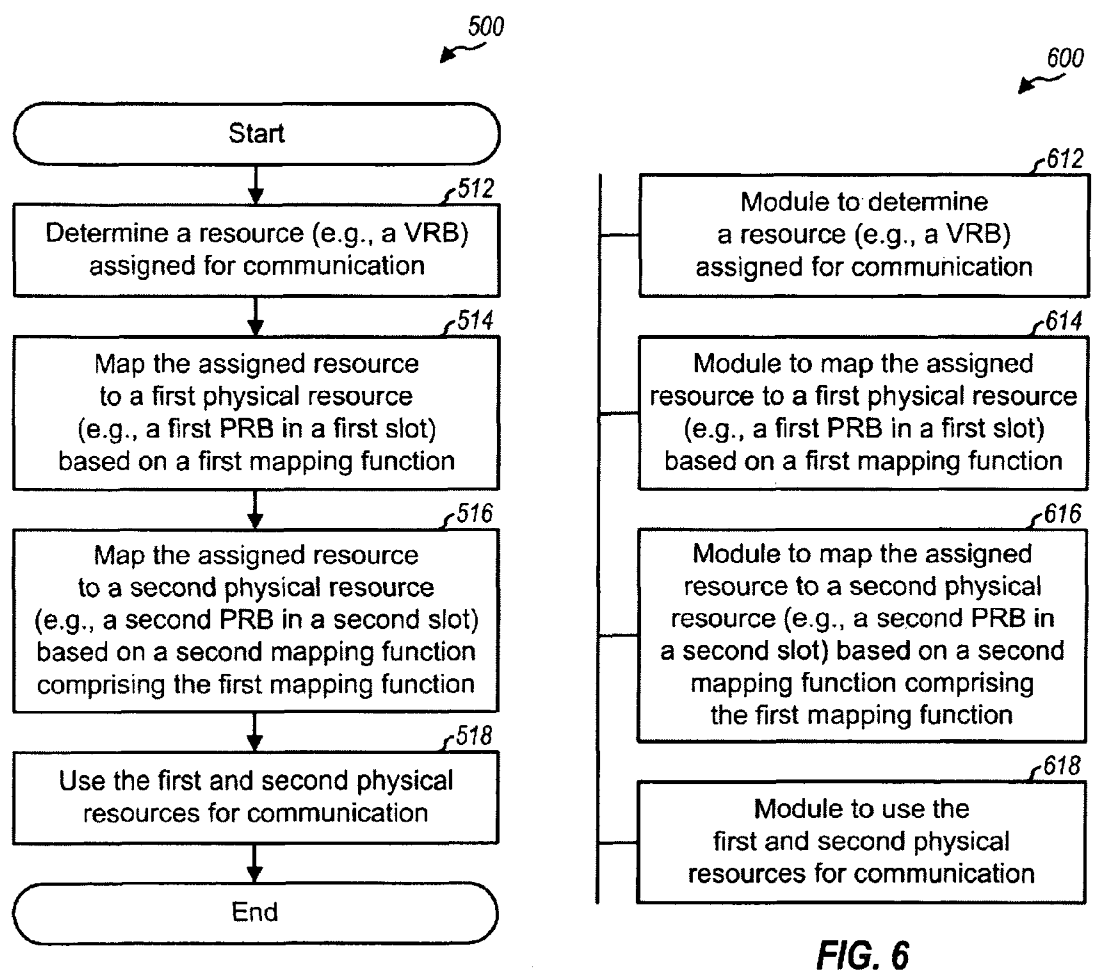
FIG. 5 shows a process for communicating in a wireless system.
FIG. 6 shows an apparatus for communicating in a wireless system.

FIG. 5 shows a design of a process 500 for communicating in a wireless communication system. Process 500 may be performed by a UE, a Node B, or some other entity. A resource assigned for communication may be determined (block 512). The assigned resource may be mapped to a first physical resource based on a first mapping function (block 514). The assigned resource may be mapped to a second physical resource based on a second mapping function comprising the first mapping function (block 516). The assigned resource may be configurable for hopping or no hopping based on at least one parameter for the second mapping function. The first and second physical resources may be used for communication (block 518).

In one design, the assigned resource may comprise a VRB, the first physical resource may comprise a first PRB in a first slot of a subframe, and the second physical resource may comprise a second PRB in a second slot of the subframe. Each resource block may comprise multiple subcarriers in one slot. The assigned resource and the first and second physical resources may also comprise other types of resources.

In one design, the first mapping function may receive an input index and provide an output index equal to the input index. In another design, the first mapping function may map consecutive input indices to non-consecutive output indices.

In one design, the second mapping function may be equal to an output of the first mapping function plus an offset. The offset may be defined by a step size and a hop value. The hop value may be configurable for the assigned resource. The step size may be N/4 or N/2, where N may be the total number of physical resources (e.g., N=N RB) or the number of physical resources with hopping (e.g., $N=N_{FDS}$). In one design, the hop value may be set to a first value to indicate no hopping or to a second value to indicate hopping by the step size. In another design, the hop value may also be set to a third value to indicate hopping by minus the step size.

In one design, an index of the assigned resource may be mapped to an index of the first physical resource based on the first mapping function, e.g., as shown in equation (1). The index of the assigned resource may also be mapped to an index of the second physical resource based on the second mapping function, e.g., as shown in equation (2).

In another design, an index of the assigned resource may be mapped to a virtual index based on a forward mapping, e.g., as shown in equation (3). The virtual index may be mapped to a first intermediate index based on the first mapping function, e.g., as shown in equation (4). The virtual index may also be mapped to a second intermediate index based on the second mapping function, e.g., as shown in equation (6). The first intermediate index may be mapped to an index of the first physical resource based on an inverse mapping complementary to the forward mapping, e.g., as shown in equation (5). The second intermediate index may be mapped to an index of the second physical resource based on the same inverse mapping, e.g., as shown in equation (7).

In one design, a Node B may assign the resource to a UE for communication. The Node B may send a resource assignment conveying the assigned resource and a hop value to the UE. If the resource assignment is for the downlink, then the Node B may send data on the first and second physical resources to the UE. If the resource assignment is for the uplink, then the Node B may receive data on the first and second physical resources from the UE.

In another design, a UE may receive a resource assignment conveying the assigned resource and a hop value. If the resource assignment is for the downlink, then the UE may receive data on the first and second physical resources. If the resource assignment is for the uplink, then the UE may send data on the first and second physical resources.

FIG. 6 shows a design of an apparatus 600 for communicating in a wireless communication system. Apparatus 600 includes a module 612 to determine a resource (e.g., a VRB) assigned for communication, a module 614 to map the assigned resource to a first physical resource (e.g., a first PRB in a first slot) based on a first mapping function, a module 616 to map the assigned resource to a second physical resource (e.g., a second PRB in a second slot) based on a second mapping function comprising the first mapping function, and a module 618 to use the first and second physical resources for communication.

Figure 7:
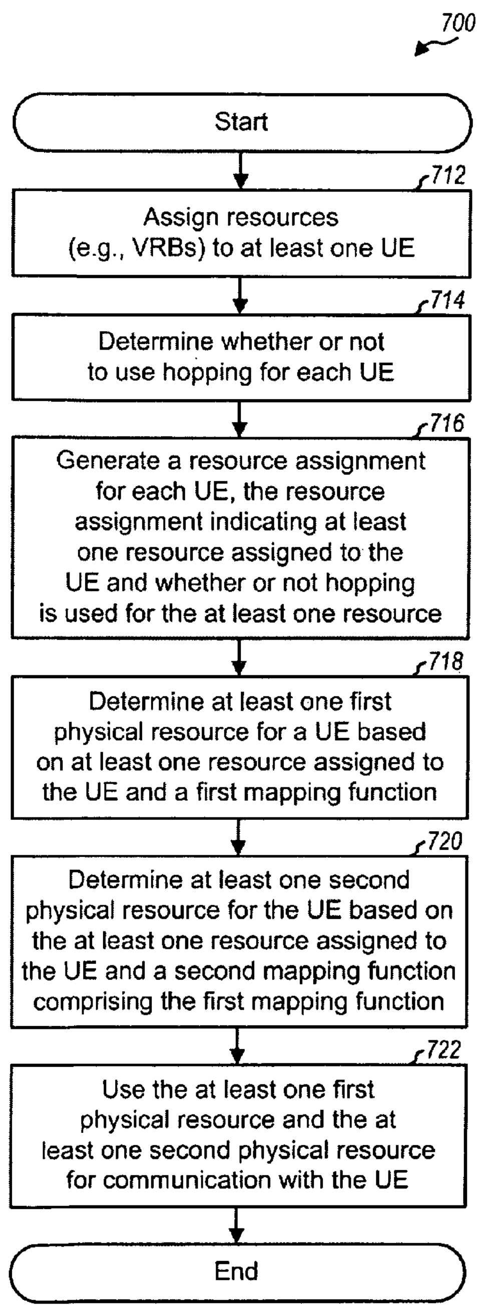
FIG. 7 shows a process for assigning resources.

FIG. 7 shows a design of a process 700 for assigning resources in a wireless communication system. Process 700 may be performed by a Node B or some other entity. Resources (e.g., VRBs) may be assigned to at least one UE (block 712). Whether or not to use hopping for each UE may be determined (block 714). A resource assignment may be generated for each UE and may indicate at least one resource assigned to that UE and whether or not hopping is used for the at least one resource (block 716). In one design, the resource assignment for each UE may comprise a hop value that may be set to a first value to indicate no hopping or to a second value to indicating hopping by a step size.

At least one first physical resource for a UE may be determined based on at least one resource assigned to the UE and a first mapping function (block 718). At least one second physical resource for the UE may be determined based on the at least one resource assigned to the UE and a second mapping function comprising the first mapping function (block 720). The at least one first physical resource and the at least one second physical resource may be used for communication with the UE (block 722).

Figure 8:
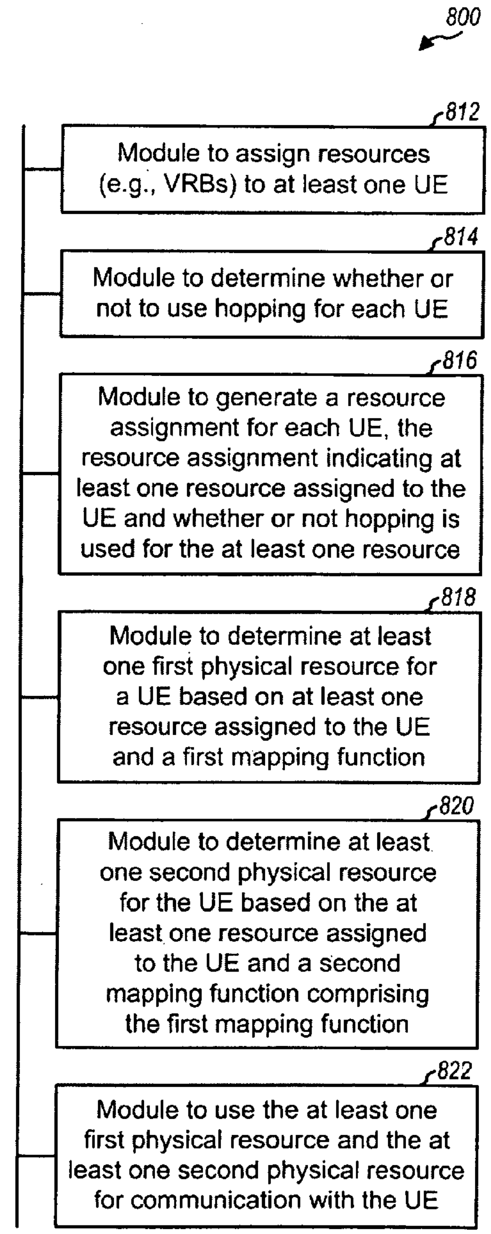
FIG. 8 shows an apparatus for assigning resources.

FIG. 8 shows a design of an apparatus 800 for assigning resources in a wireless communication system. Apparatus 800 includes a module 812 to assign resources (e.g., VRBs) to at least one UE, a module 814 to determine whether or not to use hopping for each UE, a module 816 to generate a resource assignment for each UE, the resource assignment indicating at least one resource assigned to the UE and whether or not hopping is used for the at least one resource, a module 818 to determine at least one first physical resource for a UE based on at least one resource assigned to the UE and a first mapping function, a module 820 to determine at least one second physical resource for the UE based on the at least one resource assigned to the UE and a second mapping function comprising the first mapping function, and a module 822 to use the at least one first physical resource and the at least one second physical resource for communication with the UE.

The modules in FIGS. 6 and 8 may comprise processors, electronics devices, hardware devices, electronics components, logical circuits, memories, etc., or any combination thereof.

Figure 9:
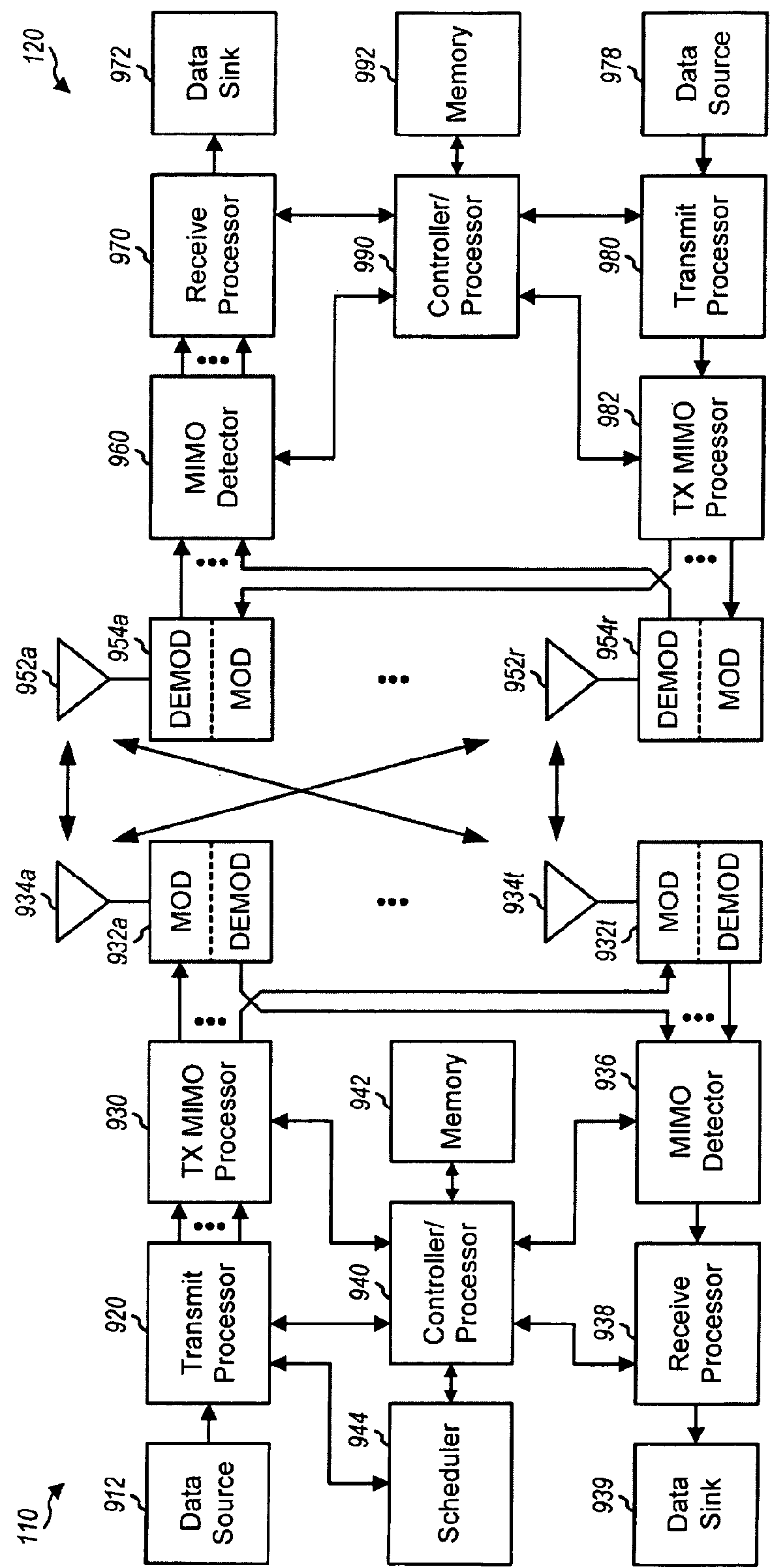
FIG. 9 shows a block diagram of a Node B and a UE.

FIG. 9 shows a block diagram of a design of Node B 110 and UE 120, which may be one of the Node Bs and one of the UEs in FIG. 1. In this design, Node B 110 is equipped with T antennas 934*a* through 934*t*, and UE 120 is equipped with R antennas 952*a* through 952*r*, where in general $T \geqq 1$ and $R \geqq 1$.

At Node B 110, a transmit processor 920 may receive data for one or more UEs from a data source 912, process data for each UE based on one or more modulation and coding schemes, and provide data symbols for all UEs. Transmit processor 920 may also receive control information or signaling (e.g., resource assignments) from a controller/processor 940 and/or a scheduler 944, process the control information, and provide control symbols. A transmit (TX) multiple-input multiple-output (MIMO) processor 930 may multiplex the data symbols, the control symbols, and pilot symbols, process (e.g., precode) the multiplexed symbols, and provide T output symbol streams to T modulators (MOD) 932*a* through 932*t*. Each modulator 932 may process a respective output symbol stream (e.g., for OFDM) to obtain an output sample stream. Each modulator 932 may further process (e.g., convert to analog, amplify, filter, and upconvert) the output sample stream to obtain a downlink signal. T downlink signals from modulators 932*a* through 932*t* may be transmitted via T antennas 934*a* through 934*t*, respectively.

At UE 120, R antennas 952*a* through 952*r* may receive the downlink signals from Node B 110 and may provide received signals to demodulators (DEMOD) 954*a* through 954*r*, respectively. Each demodulator 954 may condition (e.g., filter, amplify, downconvert, and digitize) a respective received signal to obtain received samples and may further process the received samples (e.g., for OFDM) to obtain received symbols. A MIMO detector 960 may perform MIMO detection on the received symbols from all R demodulators 954*a* through 954*r* and provide detected symbols. A receive processor 970 may process the detected symbols, provide decoded data for UE 120 to a data sink 972, and provide decoded control information to a controller/processor 990.

On the uplink, at UE 120, data from a data source 978 and control information from controller/processor 990 may be processed by a transmit processor 980, precoded by a TX MIMO processor 982 (if applicable), conditioned by modulators 954*a* through 954*r*, and transmitted via antennas 952*a* through 952*r*. At Node B 110, the uplink signals from UE 120 may be received by antennas 934, conditioned by demodulators 932, detected by a MIMO detector 936, and processed by a receive processor 938 to obtain the data and control information transmitted by UE 120.

Controllers/processors 940 and 990 may direct the operation at Node B 110 and UE 120, respectively. Controller/processor 940 and/or scheduler 944 at Node B 110 may implement or direct process 500 in FIG. 5, process 700 in FIG. 7, and/or other processes for the techniques described herein. Controller/processor 990 at UE 120 may implement or direct process 500 in FIG. 5 and/or other processes for the techniques described herein. Memories 942 and 992 may store data and program codes for Node B 110 and UE 120, respectively. Scheduler 944 may schedule UEs for transmissions on the downlink and/or uplink and may assign resources (e.g., VRBs) to the scheduled UEs. Controller/processor 940 and/or scheduler 944 may generate resource assignments for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:

determining, by a wireless apparatus, a resource assigned for communication;

mapping the assigned resource to a first physical resource based on a first mapping function, wherein the first mapping function comprises a one-to-one mapping from an index of the assigned resource to an index of the first physical resource;

mapping the assigned resource to a second physical resource based on a second mapping function, wherein an output of the second mapping function is equal to an output of the first mapping function plus an offset; and using the first and second physical resources for communication.

2. The method of claim 1, wherein the assigned resource is configurable for hopping or no hopping based on at least one parameter for the second mapping function.

3. The method of claim 1, wherein the assigned resource comprises a virtual resource block (VRB), wherein the first physical resource comprises a first physical resource block (PRB) in a first slot, wherein the second physical resource comprises a second PRB in a second slot, and wherein each resource block comprises multiple subcarriers in one slot.

4. The method of claim 1, wherein the first mapping function receives an input index and provides an output index equal to the input index.

5. The method of claim 1, wherein the first mapping function maps consecutive input indices to non-consecutive output indices.

6. The method of claim 1, wherein the offset is defined by a step size and a hop value, the hop value being configurable for the assigned resource.

7. The method of claim 6, wherein the step size is equal to N/4 or N/2, where N is total number of physical resources or number of physical resources with hopping.

8. The method of claim 6, wherein the hop value is set to a first value to indicate no hopping or to a second value to indicate hopping by the step size.

9. The method of claim 8, wherein the hop value is further set to a third value to indicate hopping by minus the step size.

10. The method of claim 1, wherein the mapping the assigned resource to the first physical resource comprises mapping the index of the assigned resource to the index of the first physical resource based on the first mapping function, and wherein the mapping the assigned resource to the second physical resource comprises mapping the index of the assigned resource to an index of the second physical resource based on the second mapping function.

11. The method of claim 1, wherein the mapping the assigned resource to the first physical resource and the mapping the assigned resource to the second physical resource comprise mapping the index of the assigned resource to a virtual index based on a forward mapping, mapping the virtual index to a first intermediate index based on the first mapping function, mapping the virtual index to a second intermediate index based on the second mapping function, mapping the first intermediate index to the index of the first physical resource based on an inverse mapping complementary to the forward mapping, and mapping the second intermediate index to an index of the second physical resource based on the inverse mapping.

12. The method of claim 1, wherein the determining the resource assigned for communication comprises assigning the resource to a user equipment (UE) for communication, and wherein the using the first and second physical resources for communication comprises sending data on the first and second physical resources to the UE.

13. The method of claim 1, wherein the determining the resource assigned for communication comprises assigning the resource to a user equipment (UE) for communication, and wherein the using the first and second physical resources for communication comprises receiving data on the first and second physical resources from the UE.

14. The method of claim 1, wherein the determining the resource assigned for communication comprises receiving an assignment of the resource at a user equipment (UE), and wherein the using the first and second physical resources for communication comprises receiving data on the first and second physical resources at the UE.

15. The method of claim 1, wherein the determining the resource assigned for communication comprises receiving an assignment of the resource at a user equipment (UE), and wherein the using the first and second physical resources for communication comprises sending data on the first and second physical resources from the UE.

16. An apparatus for wireless communication, comprising:

at least one processor configured to determine a resource assigned for communication, to map the assigned resource to a first physical resource based on a first mapping function, wherein the first mapping function comprises a one-to-one mapping from an index of the assigned resource to an index of the first physical resource, to map the assigned resource to a second physical resource based on a second mapping function, wherein an output of the second mapping function is equal to an output of the first mapping function plus an offset, and to use the first and second physical resources for communication.

17. The apparatus of claim 16, wherein the assigned resource comprises a virtual resource block (VRB), wherein the first physical resource comprises a first physical resource block (PRB) in a first slot, wherein the second physical resource comprises a second PRB in a second slot, and wherein each resource block comprises multiple subcarriers in one slot.

18. The apparatus of claim 16, wherein the offset is defined by a step size and a hop value, the hop value being configurable for the assigned resource.

19. The apparatus of claim 18, wherein the hop value is set to a first value to indicate no hopping or to a second value to indicate hopping by the step size.

20. The apparatus of claim 16, wherein the at least one processor is configured to map the index of the assigned resource to the index of the first physical resource based on the first mapping function, and to map the index of the assigned resource to an index of the second physical resource based on the second mapping function.

21. The apparatus of claim 16, wherein the at least one processor is configured to map the index of the assigned resource to a virtual index based on a forward mapping, to map the virtual index to a first intermediate index based on the first mapping function, to map the virtual index to a second intermediate index based on the second mapping function, to map the first intermediate index to the index of the first physical resource based on an inverse mapping complementary to the forward mapping, and to map the second intermediate index to an index of the second physical resource based on the inverse mapping.

22. An apparatus for wireless communication, comprising:

means for determining a resource assigned for communication;

means for mapping the assigned resource to a first physical resource based on a first mapping function, wherein the first mapping function comprises a one-to-one mapping from an index of the assigned resource to an index of the first physical resource;

means for mapping the assigned resource to a second physical resource based on a second mapping function, wherein an output of the second mapping function is equal to an output of the first mapping function plus an offset; and means for using the first and second physical resources for communication.

23. The apparatus of claim 22, wherein the assigned resource comprises a virtual resource block (VRB), wherein the first physical resource comprises a first physical resource block (PRB) in a first slot, wherein the second physical resource comprises a second PRB in a second slot, and wherein each resource block comprises multiple subcarriers in one slot.

24. The apparatus of claim 22, wherein the offset is defined by a step size and a hop value, the hop value being configurable for the assigned resource.

25. The apparatus of claim 24, wherein the hop value is set to a first value to indicate no hopping or to a second value to indicate hopping by the step size.

26. The apparatus of claim 22, wherein the means for mapping the assigned resource to the first physical resource comprises means for mapping the index of the assigned resource to the index of the first physical resource based on the first mapping function, and wherein the means for mapping the assigned resource to the second physical resource comprises means for mapping the index of the assigned resource to an index of the second physical resource based on the second mapping function.

27. The apparatus of claim 22, wherein the means for mapping the assigned resource to the first physical resource and the means for mapping the assigned resource to the second physical resource comprise means for mapping the index of the assigned resource to a virtual index based on a forward mapping, means for mapping the virtual index to a first intermediate index based on the first mapping function, means for mapping the virtual index to a second intermediate index based on the second mapping function, means for mapping the first intermediate index to the index of the first physical resource based on an inverse mapping complementary to the forward mapping, and means for mapping the second intermediate index to an index of the second physical resource based on the inverse mapping.

28. A computer program product, comprising:

a non-transitory computer-readable medium comprising:

code for causing at least one computer to determine a resource assigned for communication, code for causing at least one computer to map the assigned resource to a first physical resource based on a first mapping function, wherein the first mapping function comprises a one-to-one mapping from an index of the assigned resource to an index of the first physical resource, code for causing the at least one computer to map the assigned resource to a second physical resource based on a second mapping function, wherein an output of the second mapping function is equal to an output of the first mapping function plus an offset, and code for causing the at least one computer to use the first and second physical resources for communication.

29. A method for wireless communication, comprising:

assigning, by a Node B, resources a user equipment (UE);

determining whether or not to use hopping for the UE;

generating a resource assignment for the UE, the resource assignment indicating at least one resource assigned to the UE and whether or not hopping is used for the at least one resource;

determining at least one first physical resource for the UE based on the at least one resource assigned to the UE and a first mapping function, wherein the first mapping function comprises a one-to-one mapping from an index of the assigned resource to an index of the first physical resource;

determining at least one second physical resource for the UE based on the at least one resource assigned to the UE and a second mapping function, wherein an output of the second mapping function is equal to an output of the first mapping function plus an offset; and using the at least one first physical resource and the at least one second physical resource for communication with the UE.

30. The method of claim 29, wherein the resource assignment for the UE comprises a hop value set to a first value to indicate no hopping or to a second value to indicating hopping by a step size.

31. An apparatus for wireless communication, comprising:

at least one processor configured to assign resources to a user equipment (UE), to determine whether or not to use hopping for the UE, to generate a resource assignment for the UE, the resource assignment indicating at least one resource assigned to the UE and whether or not hopping is used for the at least one resource, to determine at least one first physical resource for the UE based on the at least one resource assigned to the UE and a first mapping function, wherein the first mapping function comprises a one-to-one mapping from an index of the assigned resource to an index of the first physical resource, to determine at least one second physical resource for the UE based on the at least one resource assigned to the UE and a second mapping function, wherein an output of the second mapping function is equal to an output of the first mapping function plus an offset, and to use the at least one first physical resource and the at least one second physical resource for communication with the UE.

32. The apparatus of claim 31, wherein the at least one processor is configured to set a hop value for the UE to a first value to indicate no hopping or to a second value to indicating hopping by a step size, and to generate the resource assignment for each UE to include the hop value for the UE.

* * * * *